United States Patent
Wang et al.

(10) Patent No.: US 6,803,684 B2
(45) Date of Patent: Oct. 12, 2004

(54) SUPER-CONDUCTING SYNCHRONOUS MACHINE HAVING ROTOR AND A PLURALITY OF SUPER-CONDUCTING FIELD COIL WINDINGS

(75) Inventors: Yu Wang, Clifton Park, NY (US); James Pellegrino Alexander, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 09/854,932

(22) Filed: May 15, 2001

(65) Prior Publication Data

US 2002/0171312 A1 Nov. 21, 2002

(51) Int. Cl.[7] .................................................. H02K 9/00
(52) U.S. Cl. ......................................................... 310/52
(58) Field of Search ............................ 310/179, 52, 64, 310/214, 215

(56) References Cited

U.S. PATENT DOCUMENTS

| | | | |
|---|---|---|---|
| 4,277,705 A | * 7/1981 | Rios | 310/215 |
| 4,385,248 A | * 5/1983 | Laskaris | 29/596 |
| 4,642,503 A | * 2/1987 | Ueda et al. | 310/208 |
| 5,532,663 A | 7/1996 | Herd et al. | 335/216 |
| 5,548,168 A | 8/1996 | Laskaris et al. | 310/52 |
| 5,672,921 A | * 9/1997 | Herd et al. | 310/52 |
| 5,774,032 A | 6/1998 | Herd et al. | 335/216 |
| 5,777,420 A | 7/1998 | Gamble et al. | 310/261 |
| 5,798,678 A | 8/1998 | Manlief et al. | 335/216 |
| 5,953,224 A | 9/1999 | Gold et al. | 363/98 |
| 6,066,906 A | * 5/2000 | Kalsi | 310/112 |
| 6,140,719 A | 10/2000 | Kalsi | 310/52 |
| 6,169,353 B1 | * 1/2001 | Driscoll et al. | 310/261 |
| 6,173,577 B1 | 1/2001 | Gold | 62/51.1 |
| 2003/0010039 A1 | 1/2003 | Maguire et al. | 62/6 |

OTHER PUBLICATIONS

Fast, Reactive Power Support, *HTS Generators*, American Superconductor™(Feb. 27, 2001)pp. 1–4.

* cited by examiner

Primary Examiner—Nestor Ramirez
Assistant Examiner—Hanh Nguyen
(74) Attorney, Agent, or Firm—Nixon & Vanderhye P.C.

(57) ABSTRACT

A rotor for a synchronous machine is disclosed that comprises a rotor core having a rotor axis, and a pair of super-conducting coil windings mounted on the rotor core, each of said coil windings in a respective plane that is parallel to and offset from the rotor axis.

21 Claims, 5 Drawing Sheets

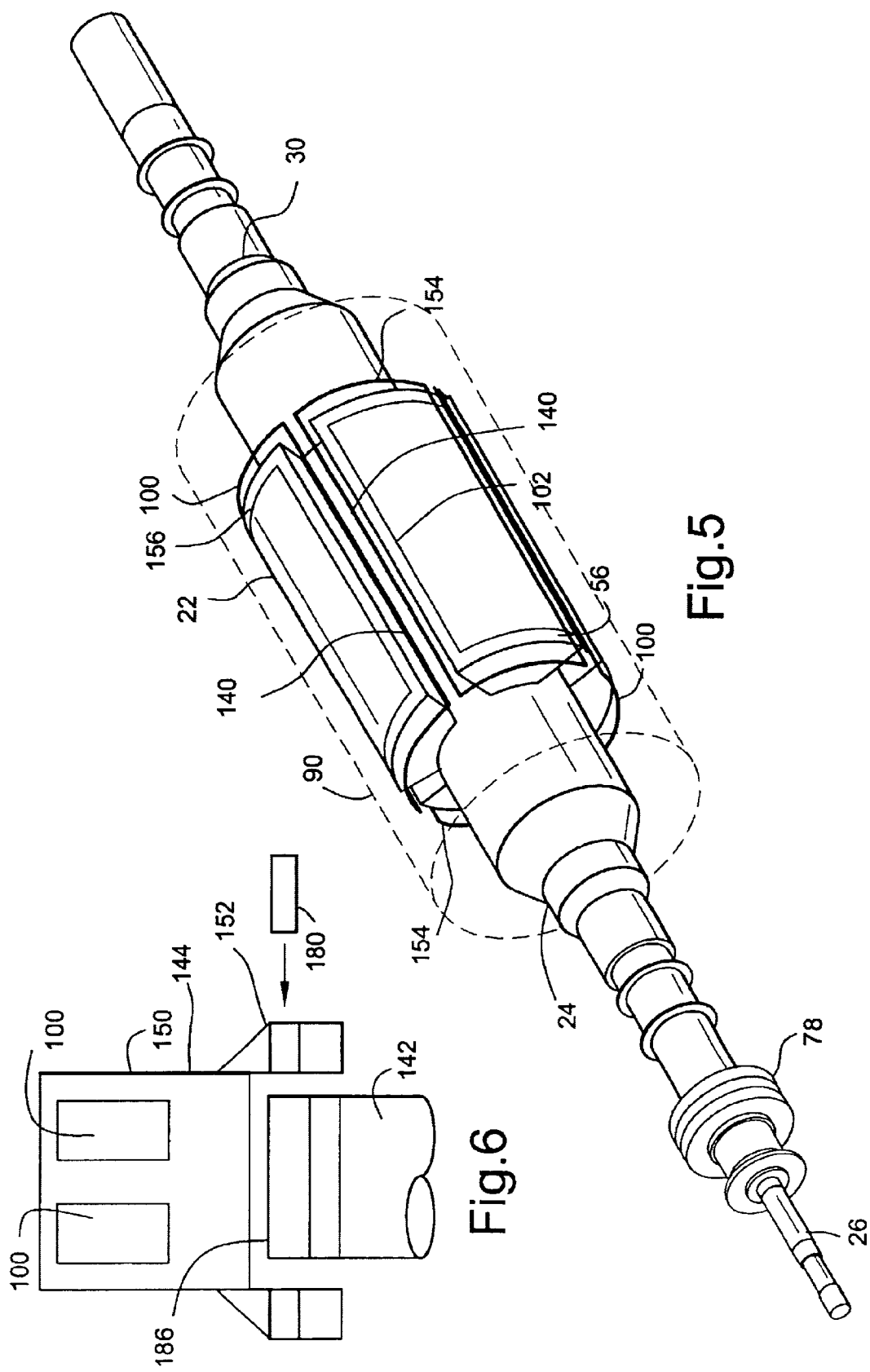

SUPER-CONDUCTING SYNCHRONOUS MACHINE HAVING ROTOR AND A PLURALITY OF SUPER-CONDUCTING FIELD COIL WINDINGS

RELATED APPLICATIONS

This application is related to the following commonly-owned and commonly-filed applications (the specifications and drawings of each are incorporated herein):

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support And Coil Support Method", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a super-conductive coil in a synchronous rotating machine. More particularly, the present invention relates to a support structure for super-conducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at air-gap magnetic field strength of about 2 Tesla. Known super-conductive rotors employ air-core designs, with no iron in the rotor, to achieve air-gap magnetic fields of 3 Tesla or higher, which increase the power density of the electrical machine and result in significant reduction in weight and size. Air-core super-conductive rotors, however require large amounts of super-conducting wire, which adds to the number of coils required, the complexity of the coil supports, and the cost. Such super-conductive rotors have their super-conducting coils cooled by liquid helium, with the used helium cooled being returned as room-temperature gaseous helium. Using liquid helium for cryogenic cooling requires continuous reliquefaction of the returned, room-temperature gaseous helium, and such reliquefaction poses significant reliability problems and requires significant auxiliary power.

High temperature SC coil field windings are formed of super-conducting materials that are brittle, and must be cooled to a temperature at or below a critical temperature, e.g., 27° K., to achieve and maintain super-conductivity. The SC windings may be formed of a high temperature super-conducting material, such as a BSCCO ($Bi_xSr_xCa_xCu_xO_x$) based conductor.

SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature. As a result, no iron can be used in the rotor magnetic circuit because of the brittle nature of iron at cryogenic temperatures.

What is needed is a super-conducting field winding assemblage for an electrical machine that does not have the disadvantages of the air-core and liquid-cooled super-conducting field winding assemblages of, for example, known super-conductive rotors.

In addition, high temperature super-conducting (HTS) coils are sensitive to degradation from high bending and tensile strains. These coils must undergo substantial centrifugal forces that stress and strain the coil windings. Normal operation of electrical machines involves thousands of start-up and shut-down cycles over the course of several years that result in low cycle fatigue loading of the rotor. Furthermore, the HTS rotor winding must be capable of withstanding 25% overspeed operation during rotor balancing at ambient temperature and occasional over-speed at cryogenic temperatures during operation. These overspeed conditions substantially increase the centrifugal force loading on the windings over normal operating conditions.

HTS coils used as the rotor field winding of an electrical machine are subjected to stresses and strains during cool-down and normal operation as they are subjected to centrifugal loading, torque transmission, and transient fault conditions. To withstand the forces, stresses, strains and cyclical loading, the HTS coils must be properly supported in the rotor. These support systems and structures that hold the coils in the rotor should secure the coils against the tremendous centrifugal forces due to the rotation of the rotor. Moreover, these support systems and structures should protect the HTS coils and ensure that the coils do not crack, fatigue or otherwise break.

Developing support systems for HTS coil has been a difficult challenge in adapting SC coils to rotors. Examples of HTS coil support systems for rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a rotor and coil support system for a HTS coil in a synchronous machine. The need exists for HTS coil support system made with low cost and easy-to-fabricate components.

BRIEF SUMMARY OF THE INVENTION

A rotor having twin HTS coils on a rotor core of a synchronous machine. Similarly, a support structure is disclosed for mounting the pair of HTS coils on the rotor. The rotor may be for a synchronous machine originally designed to include HTS coils. Alternatively, the HTS rotor may replace a copper coil rotor in an existing electrical machine, such as in a conventional generator. The rotor and its HTS coils that are described here in the context of a generator, but the HTS coil rotor is also suitable for use in other synchronous machines.

A dual racetrack HTS coil design for two-pole field winding provides several advantages including simplicity in coil design and in coil support design. In addition, a dual coil design has substantially twice the amount of coil winding of a single-coil rotor. Thus, a dual coil design has a substantially greater capacity for power generation (when the coil is incorporated in a rotor of a generator).

In a first embodiment, the invention is a rotor for a synchronous machine comprising: (i) a rotor core having a rotor axis; and (ii) a pair of super-conducting coil windings mounted on the rotor core, each of said coil windings in a respective plane that is parallel to and offset from the rotor axis.

In another embodiment, the invention is a rotor for a synchronous machine comprising: (i) a rotor core having a rotor axis and recessed surfaces extending longitudinally along the rotor core; (ii) a first and second super-conducting coil windings mounted on the rotor core, each of said coil windings being in a plane that is parallel to and offset from the rotor axis; (iii) a plurality of first tension rods spanning and connecting opposite side sections of each of said coil windings, and (iv) a plurality of second tension rods spanning between and connecting both of the coil windings.

BRIEF DESCRIPTION OF THE DRAWINGS

The accompanying drawings in conjunction with the text of this specification describe an embodiment of the invention.

FIG. 5 is a schematic perspective view of an exemplary SC rotor with dual saddle coils (without a coil support system).

FIG. 6 is a schematic of a coil housing for dual saddle coils.

DETAILED DESCRIPTION OF THE INVENTION

Figure 1:
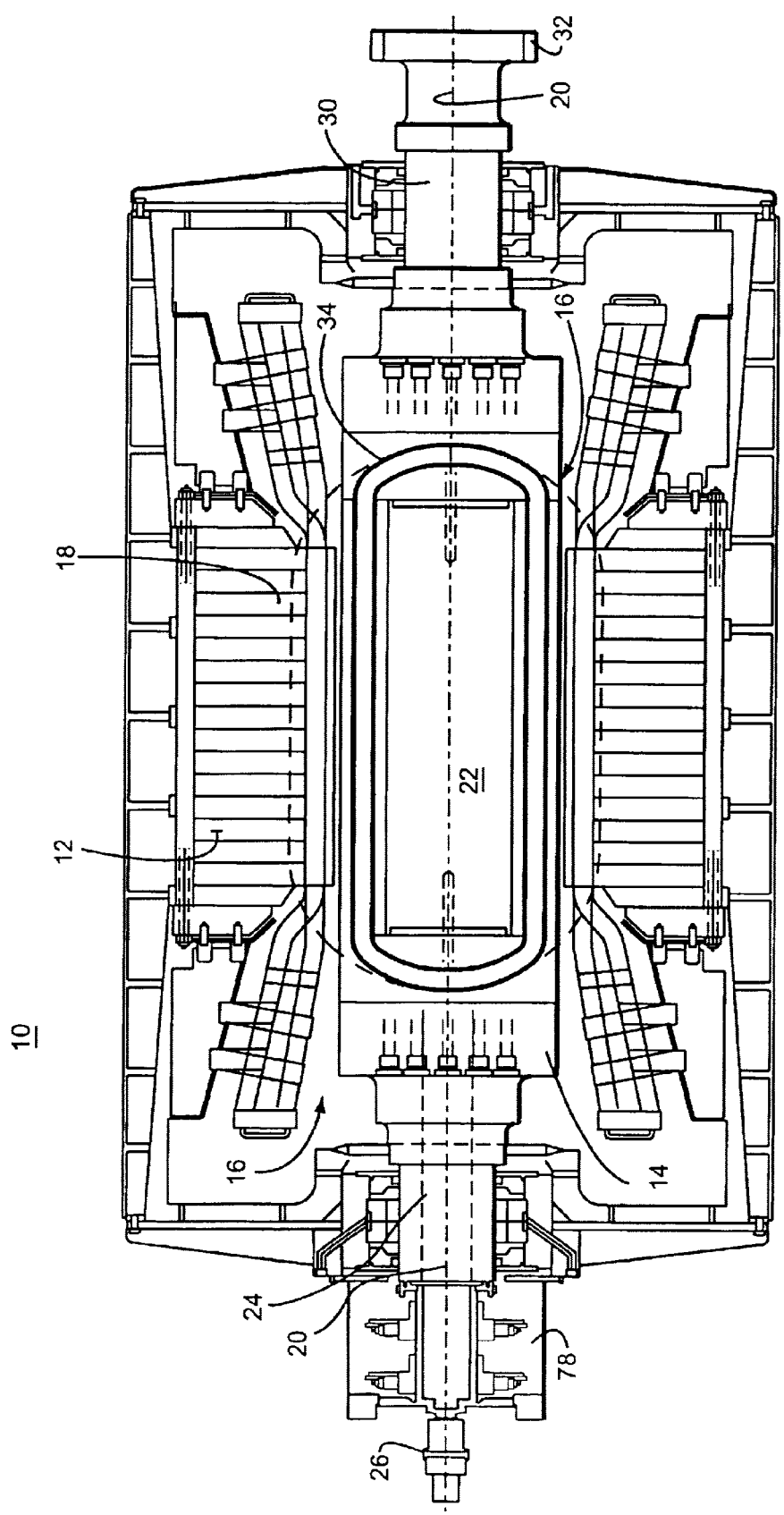
FIG. 1 is a schematic side elevational view of a super-conductive (SC) rotor shown within a stator.

FIG. 1 shows an exemplary synchronous generator machine 10 having a stator 12 and a rotor 14. The stator (illustrated by dotted lines) includes field winding coils that surround the cylindrical rotor cavity 16 of the stator. The rotor fits inside the rotor cavity of the stator. As the rotor turns within the stator, a magnetic field 18 generated by the rotor and rotor coils moves through the stator and creates an electrical current in the windings of the stator coils. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force (MMF), and, thus, the wire usage. For example, the iron rotor core can be magnetically saturated at an air-gap magnetic field strength of about 2 Tesla.

Figure 3:
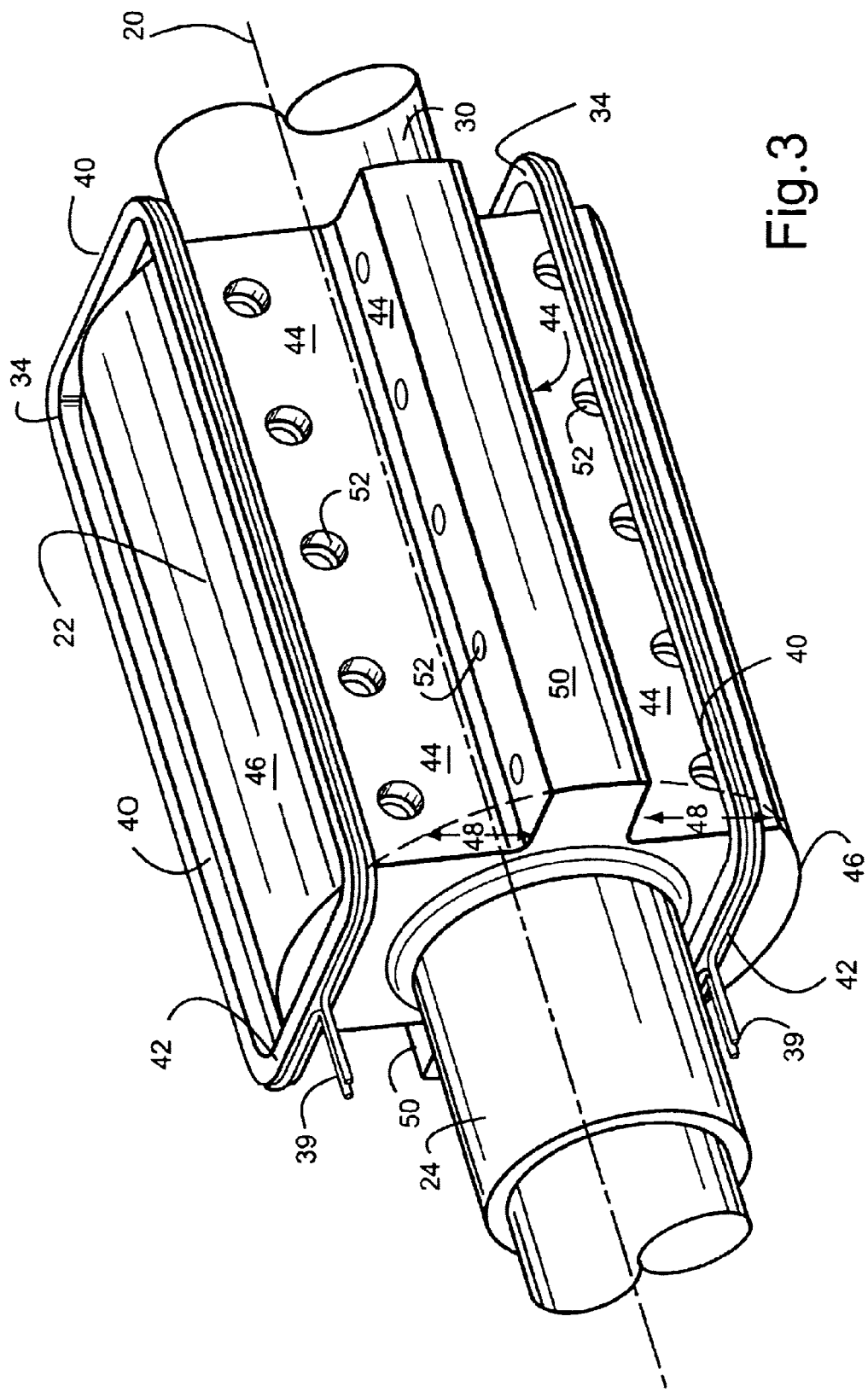
FIG. 3 is a schematic perspective view of an exemplary SC rotor with dual HTS racetrack coils (without a coil support system).

The rotor 14 supports a generally a pair of longitudinally-extending, racetrack-shaped high temperature super-conducting (HTS) coils (See FIG. 3). The super-conductive coil may be alternatively a saddle-shape or have some other shape that is suitable for a particular rotor design. The coil support system disclosed here may be adapted for coil configurations other than a racetrack coil shape.

The rotor includes a pair of end shafts 24, 30 that brace the core 22 and are supported by bearings and can be coupled to external devices. The collector end shaft 24 includes a collector rings 78 that provide an external electrical connection for the connections 79 on the coil 36 of the coil winding 34. In addition, the collector end shaft has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive end shaft 30 includes a power coupling 32 to a driving turbine, for example.

Figure 2:
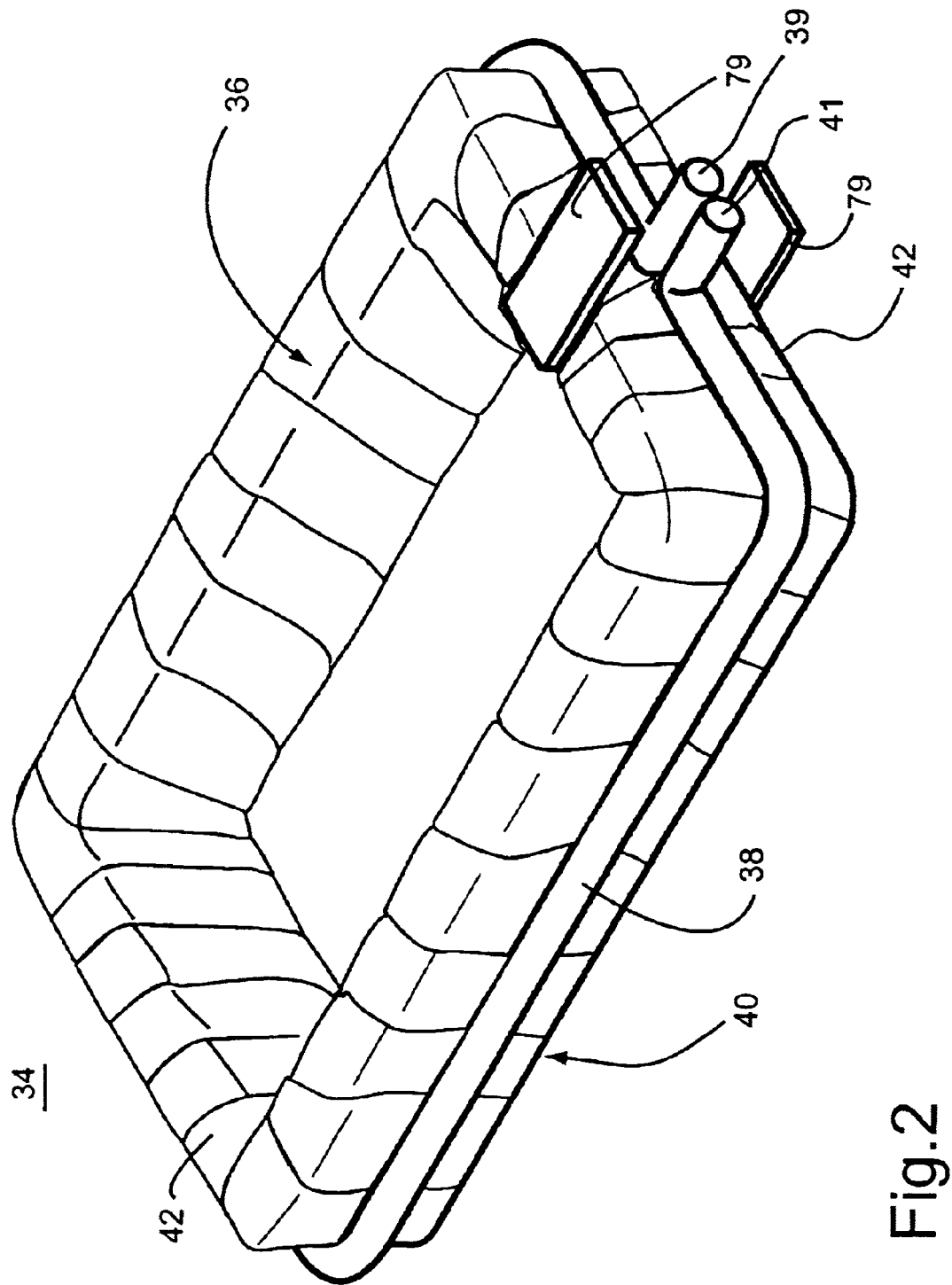
FIG. 2 is a schematic perspective view of a high temperature super-conducting (HTS) racetrack coil suitable for use in the SC rotor shown in FIG. 1.

FIG. 2 shows an exemplary HTS racetrack field coil winding 34. The SC field winding coils 34 of the rotor includes a high temperature super-conducting (HTS) coil 36. Each HTS coil includes a high temperature super-conducting conductor, such as a BSCCO ($Bi_xSr_xCa_xCu_xO_x$) conductor wires laminated in a solid epoxy impregnated winding composite. For example, a series of $B_2S_2C_2C_3O$ wires can be laminated and bound in a solid epoxy impregnated coil.

HTS wire is brittle and easy to be damaged. The HTS coil is typically layer wound with HTS tape, and is epoxy impregnated in a precision coil form to attain close dimensional tolerances. The tape is wound around in a helix to form a racetrack SC coil 36. The wire is wrapped to form a racetrack winding that includes cooling conduits that are bonded on one or more outside coil surfaces to provide cooling by conduction heat transfer. In the saddle coil embodiment, the tape may be arranged so that it is oriented radially with respect to the rotor.

The dimensions of the racetrack coil are dependent on the dimensions of the rotor core. Generally, each racetrack coil encircles the magnetic poles of the rotor core, and is parallel to the rotor axis. The HTS coil windings are continuous around the racetrack. The coils form a resistance-free current path around the rotor core and between the magnetic poles of the core.

Fluid passages 38 for cryogenic cooling fluid are included in the coil winding 34. These passages may extend around an outside edge of the SC coil 36. The passageways provide cryogenic cooling fluid to remove heat from those coils by conduction heat transfer. The cooling fluid maintains the low temperatures, e.g., 27° K., in the SC coil winding needed to promote super-conducting conditions, including the absence of electrical resistance in the coil. The cooling passages have an input ports 39 and output ports 41 at one end of the rotor core. These ports 39, 41 connect to cooling passages 38 on the SC coil to the cryogen transfer coupling 28.

Each HTS racetrack coil winding 34 has generally-straight side portions 40 parallel to a rotor axis 20 and end portions 42 that are perpendicular to the rotor axis. The side portions of the coil are subjected to the greatest centrifugal stresses because they are the portions of the coil furthest from the rotor axis. Accordingly, these side portions of the coil are supported by a support system (shown in FIGS. 3 and 4) that secures the side portions of the coil and counteract the centrifugal forces that act on the coil side portions.

FIG. 3 is a schematic diagram of a rotor core 22 with dual HTS racetrack coil windings 34. The end shafts 24, 30 extend from opposite ends of the rotor core. The rotor core may be an iron forging having desirable magnetic characteristics, such as high magnetic flux permeability. The rotor core may have two magnetic poles, wherein the poles are at opposite ends of the rotor core. The rotor core electromagnetically interacts with the coil windings to promote the electromagnetic fields around the rotor and stator.

The rotor core and end shafts may be integrally formed, e.g., by forging, from a single iron shaft. Alternatively, the rotor core and end shafts may be discrete components (and even the core may be a multi-piece core) that are assembled together. The core forging may be made into three pieces to facilitate rotor assembly. However, in the example shown here, the rotor core is integral with the end shafts, and the core and shafts are continuous along the entire length of the rotor. Alternatively, the iron rotor core may be made of multiple sections along shaft longitudinal direction.

The iron rotor core 22 has a generally cylindrical shape suitable for rotation within the stator 12. To receive the coil windings, the rotor core has recessed surfaces 44, such as flat or triangular regions or slots, formed in the curved surface of the cylindrical core and extending longitudinally across the rotor core. The coil windings 34 are mounted on the rotor adjacent these recessed areas. The coils generally extend longitudinally along an outer surface of the recessed area. These recessed surfaces 44 on the rotor core are intended to receive the coil windings and, thus, the shape of the recess is designed to conform to the coil winding. For example, if the coil winding has a saddle-shape or some other shape, the recess(es) in the rotor core would be configure to receive the shape of the winding.

The recessed surfaces 44 in the rotor core receive the coil windings such that the outer-surfaces of the coil windings extend to substantially an envelope defined by the rotation of the rotor. The outer curved surfaces 46 of the rotor core when rotated define a cylindrical envelope. This rotation envelope of the rotor has substantially the same diameter as the rotor cavity 16 (see FIG. 1) in the stator.

The gap between the rotor envelope and stator cavity is a relatively-small clearance as required for forced flow ventilation cooling of the stator only, since the rotor requires no ventilation cooling. It is desirable to minimize the clearance between the rotor and stator so as to increase the electromagnetic coupling between the rotor coil windings and the stator windings. Moreover, the rotor coil windings are preferably positioned such that they extend to the envelope formed by the rotor and, thus, are separated from the stator by only the clearance gap between the rotor and stator.

In a dual HTS coil winding arrangement, the rotor core 22 has two pair of recess surfaces 44 for the twin coils. These four recessed surfaces are symmetrically arranged around the rotor core periphery to provide balance during rotation. These surfaces 44 each define a volume 48 in the rotor core extending the length of the rotor core that has a generally right-angled triangular cross section. The hypotenuse of this triangular cross section is an arc of the surface 46 of the rotor core. Each volume 48 receives a side portion 40 of one of the two HTS coil windings 34. The warm iron core 22 has an array of conduit apertures 52 to allow the tension bars to extend through the rotor.

A pair of rotor core ridges 50 extend longitudinally along the rotor and on opposite sides of the rotor. The pair of ridges extends radially outward on the rotor to the envelope formed by the rotation of the rotor. Each core ridge is between the two coils 34 and the recessed surfaces 44 on which the coils are mounted. The ridges are integral to the rotor core and formed of the same magnetic permeable material as is other portions of the rotor core. The ridges are designed to enhance the bending stiffness of the rotor about the pole axis as required to reduce the twice per revolution vibration of the rotor.

The principal loading of the HTS coil in an iron core rotor is from centrifugal acceleration during rotor rotation. An effective coil structural support is needed to counteract the centrifugal forces. The coil support is needed especially along the side sections 40 of the coil that experience the most centrifugal acceleration. To support the side sections of coils, tension rods (see FIG. 4) span between the coils and grasp opposite side sections of a coil. The tension rods may also extend between the pair of coils to provide support between the dual coils. The tension rods extend through conduits 52, e.g., apertures, in the rotor core so that they may span between side sections of the same coil or between adjacent coils the tension rods.

The conduits 52 are generally cylindrical passages in the rotor having a straight axis. The diameter of the conduits may be sufficiently larger than the diameter of the tension rods so as to avoid having the rotor contact the tension rods and, thus, avoid thermal conduction heat transfer between the rotor and the rods. The diameter of the conduits is substantially constant, except at their ends near the recessed surfaces of the rotor. At their ends, the conduits may expand to a larger diameter to accommodate a cylindrical sleeve (see FIG. 4) for the tension rods.

The conduits 52 are apertures, i.e., holes, that extend through the rotor core and provide a passageway for the tension rods. The conduits have a generally-circular diameter and a straight axis through the rotor. The axis of the conduits are generally in a plane defined by the racetrack coil to which the conduit corresponds. In addition, the axis of the conduit is perpendicular to the side sections of the coil to which are connected the tension rod that extends through the conduit. Further, the diameter of the rotor conduits are sufficiently large such than the tension rods need not contact the rotor. Avoiding contact between the tension rods and the rotor core minimizes the conduction of heat from the rotor core, through the tension rods and to the cooled SC coil windings.

The conduits 52 may be perpendicular to the side sections 40 of the coil. For those tension rods that span between opposite side sections of the same coil, the corresponding conduits are in the same plane as that coil. For those tension rods that extend between the dual coils, the corresponding conduits may be perpendicular to the plane of both coils and extend through the ridges 50 of the rotor core. The number of conduits and the location of the conduits will depend on the location of the HTS coils and the number of coil housings (see FIG. 4) needed to support the side sections of the coils.

Figure 4:
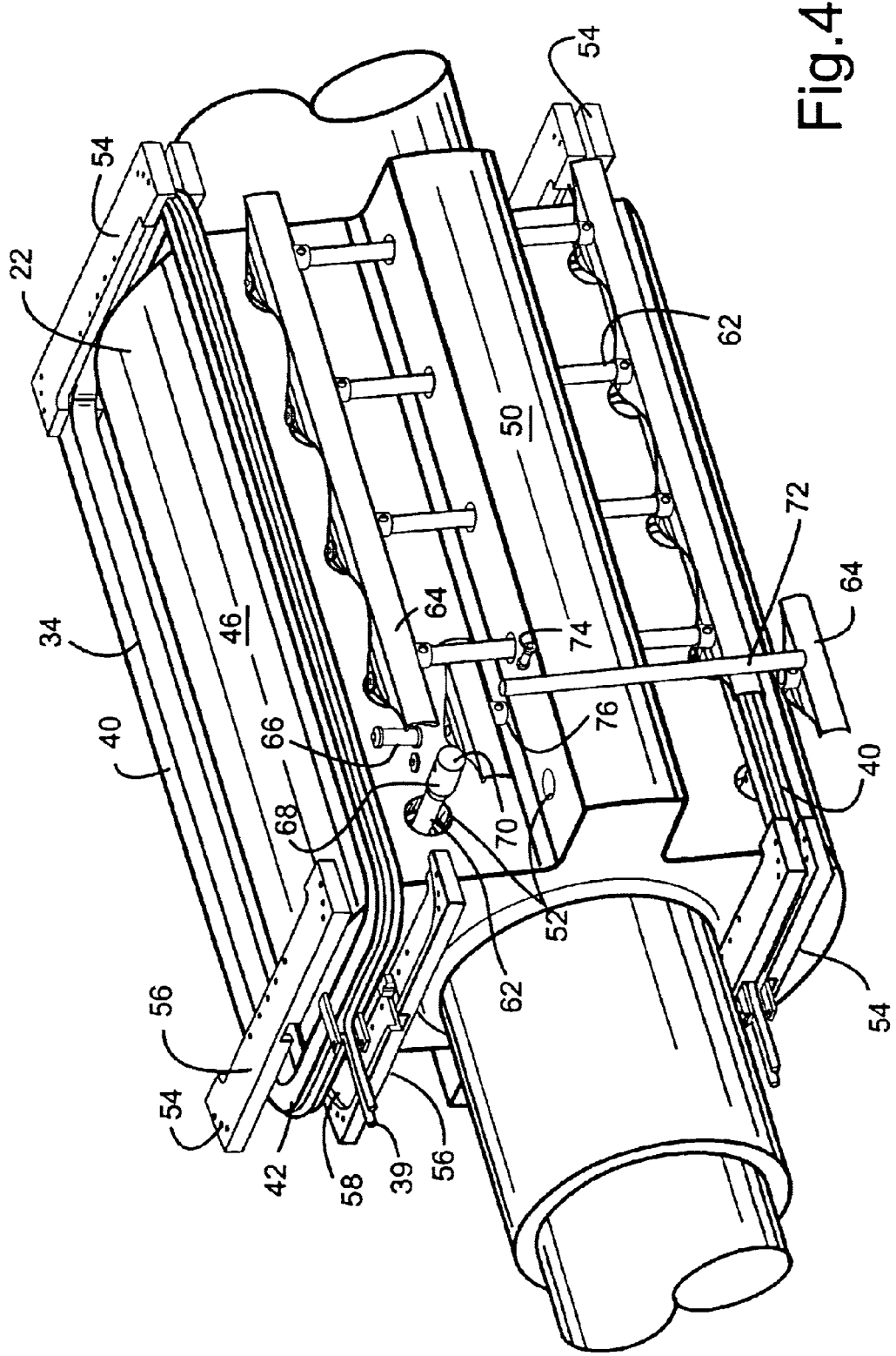
FIG. 4 is a schematic perspective view of an exemplary SC rotor with dual HTS racetrack coils (with a coil support system).

As shown in FIG. 4, the end sections 42 of each of the pair of coil windings 34 are adjacent opposite ends of the rotor core. A split-clamp 54 (FIG. 4) holds the end section of the coil windings. The split clamp includes a pair of plates between which are sandwiched the end section of a coil. The split clamp may be formed of a non-magnetic material, such as Inconel X718. The same or similar non-magnetic materials may be used to form the tension rods, and other portions of the support system. The support system is preferably non-magnetic so as to preserve ductility at cryogenic temperatures, since ferromagnetic materials become brittle at temperatures below the Curie transition temperature and cannot be used as load carrying structures.

The split clamp 54 at each end of the coil winding includes a pair of opposite plates 56 between which are sandwiched the end section 42 of the coil. The surfaces of the clamp plates 56 includes channels 58 to receive the end sections of the coil windings. The split clamp may be supported by a collar (not shown) or other structural device that holds the clamp to the rotor core and enables the clamp to support the end sections of the HTS coils.

The electrical and cooling fluid couplings 39 cooling to the coils are at the coil end sections 42. An electrical coupling to the coil is provided at the end section nearest the end shaft having a collector (not shown) for providing electrical connection to the rotating coils on the rotor. A cooling fluid coupling is provided at the opposite end section of each coil winding so that cryogenic cooling fluid can flow to the coils and heat been removed from the coils in the cooling fluid that is circulated back from the coils and to the cooling system.

The side sections 40 of the racetrack-shaped HTS coil 34 are supported by a series of tension rods 62 that extend through the conduits 52 in the rotor core body. The tension rods are non-magnetic, straight bars that extend between opposite side sections of the same coil, or between side sections of the two coils. The tension rod may be formed of a high strength non-magnetic alloys, such as Inconel X718. The tension rods have at each end a coupling with a channel housing 64 that hold the coil winding. The channel housings and the tension rods provide adjustment of the tension applied to the side sections of the coil windings.

The coil winding supports hold the coil windings on the rotor, and buttress the windings against the centrifugal forces and vibrations resulting from the rotation of the rotor and operation of the electrical machine. The coil winding supports include tension rods that extend through the rotor and clamp onto the coil windings at both ends of the rod. The tension rods support the coil especially well with respect to centrifugal forces as the rods extend substantially radially to the coil winding. Each tension rod is a shaft with continuity along the longitudinal direction of the rod and in the plane of the racetrack coil. The longitudinal continuity of the tension rods provides lateral stiffness to the coils which provides rotor dynamics benefits.

Moreover, the lateral stiffness permits integrating the coil support with the coils so that the coil can be assembled with support prior to final rotor assembly. Pre-assembly of the coil and coil support reduces production cycle, improves coil support quality, and reduces coil assembly variations. The racetrack coil is supported by an array of tension members that span the long sides of the coil. The tension rod coil support members are pre-assembled to coil.

The HTS coil and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through apertures, e.g., conduits, in the rotor but are not in contact with the rotor. This lack of contact avoids the conduction of heat from the rotor to the tension rods and coils.

To reduce the heat leaking away from the coil, the coil support is minimized to reduce the thermal conduction through support from heat sources such as the rotor core. There are generally two categories of support for super-conducting winding: (i) "warm" supports and (ii) "cold" supports. In a warm support, the supporting structures are thermally isolated from the cooled SC windings. With warm supports, most of the mechanical load of a super-conducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary support system disclosed here are cold supports in that the tension rods and associated housings the coupled the tension rods to the SC coil windings are maintained at or near a cryogenic temperature. Because the supporting members are cold, these members are thermally isolated, e.g., by the non-contact conduits through the rotor core, from other "hot" components of the rotor.

An individual support member consists of a tension rod 62, a channel housing 64, and a dowel pin 66 that connects the housing to the end of the tension rod. Each channel housing 64 is a U-shaped bracket having legs that connect to a tension rod and a channel to receive the coil winding 34. The U-shaped housing allows for the precise and convenient assembly of the support system for the coil. The channel housings collectively distributes the forces that act on the coil, e.g., centrifugal forces, over substantially the entire side sections 40 of each coil.

The channel housings 64 collectively extend the length of each of the side sections 40 of the HTS coils 34. The channel housings prevent the side sections of the coils from excessive flexing and bending due to centrifugal forces. The coil supports do not restrict the coils from thermal expansion and contraction that occur during normal start/stop operation of the gas turbine. In particular, the thermal expansion causes the length of the side sections to increase or decrease and, thus, slide longitudinally with respect to the support system.

The transfer of the centrifugal load from the coil structure to a support rod is through a U-shaped housing that fits around the coil outside surface and side straight sections, and is doweled 66 to a wide diameter end 68 of the tension rod. The U-shaped housing is formed of a light, high strength material that is ductile at cryogenic temperatures. Typical materials for channel housing are aluminum, Inconel, or titanium alloys, which are non-magnetic. The shape of the U-shaped housing can be optimized for low weight.

The dowel pin 66 through the U-shaped housing and tension rod may be hollow for low weight. Locking nuts or pins are threaded or attached at the ends of the dowel pin to secure the U-shaped housing sides from spreading apart under load. The dowel pin can be made of high strength Inconel or titanium alloys. The tension rods are made with larger diameter ends 68 that are machined with two flats 70 at their ends to fit the U-shaped housing and coil width. The flat ends 70 of the tension rods abut against the inside surface of the HTS coils, when the rod, coil and housing are connected together. This construction reduces the stress concentration in the region of the tension rod hole that receives the dowel.

The tension rods 72 that extend between adjacent coils also attach to the U-shaped channel housings 64. These tension rods provide a framework to support the dual coils with respect to each other. The tension rods 72 insert into female connectors 74 in the sides of each channel housing. A locking dowel 74 may be used to secure the tension rod 76 to the side of the channel housing.

The coil support system of tension rods 62, channel housings 64 and split-clamp 54 may be assembled as the HTS coil windings 34 are mounted on the rotor core 22. Indeed, the coil support system is largely the means by which the HTS coil windings are attached to the rotor core. The frame of tension rods and channel housings provides a fairly ridged structure for supporting the coil windings and holding the coil windings in place with respect to the rotor core.

The coil winding 34 may be shielded from stator-induced magnetic flux by a conductive cylinder around the rotor core. In addition, the coil winding may be in a vacuum to insulate the winding from the heat of the rotor. The vacuum may be formed by a cylindrical vacuum vessel around the rotor core.

FIG. 5 is a schematic view of dual saddle coil 100 mounted on a rotor 20. The saddle coils each have a similar construction to the racetrack winding shown in FIG. 2, in that each coil is formed of wrapped SC coil 36 and has a cooling passage 38 for maintaining the coil at cryogenic temperatures. The saddle coils have a long side section 140 that fit into a longitudinal slot 102 in the rotor core. The slots extend the length of the core 22, and are each on opposite sides of the core. The saddle coils have end sections 154 that are adjacent the ends 156 of the rotor core. Thus, the saddle coils each extend through the pair of slots in the core and wrap around the ends of the core. A shield 90 covers the coils and provides a vacuum for the coils, and is conductive to prevent electromagnetic fields from the stator from penetrating the sensitive coils.

FIG. 6 is a schematic diagram of a coil housing 144 for the dual saddle coils 100. The coil housing is similar to the housing 44 for the racetrack coil windings, except that the saddle housing 144 fits over a pair of windings. The saddle housing has a pair of legs 150 each with an aperture 152 to receive a dowel 180. The dowel connects the housing to a tension rod 142 that extends through a conduit in the core. The end 186 of the tension rod is flat and forms a support surface for the sides of the saddle coils facing the core.

While the invention has been described in connection with what is presently considered to be the most practical and preferred embodiment, it is to be understood that the invention is not to be limited to the disclosed embodiment, but on the contrary, is intended to cover body, and the coil winding having side sections adjacent the flat surfaces.

What is claimed is:

1. A rotor for a synchronous machine comprising:
   a warm rotor core having a rotor axis;
   a pair of cryogenically cold super-conducting coil windings mounted on the rotor core, each of said coil windings in a respective plane that is parallel to and offset from the rotor axis, and each of said coil windings having an end section extending beyond an end of the rotor core, and
   a cryogenically cold coil support attached the pair of cryogenically cold coil windings to form an assembly of the coil support and coil windings, and said assembly being separated from said rotor core by a gap.

2. A rotor as in claim 1 wherein the super-conducting coils have a race-track shape.

3. A rotor as in claim 1 wherein the super-conducting coils each have a pair of opposite side sections that are parallel to the rotor axis and coupled to the end section.

4. A rotor as in claim 1 wherein the rotor core has recessed surfaces extending longitudinally along the rotor core and said recessed surfaces receive the coil windings.

5. A rotor as in claim 1 wherein the super-conduction coils included a high temperature super-conducting (HTS) wire extending round the entire coil.

6. A rotor as in claim 1 further comprising tension rods extending between and connecting the coil windings.

7. A rotor as in claim 1 further comprising tension rods extending between and connecting the coil windings, and extending through conduits in the rotor core.

8. A rotor as in claim 1 further comprising tension rods extending between and connecting the coil windings, and wherein said tension rods are perpendicular to the respective planes of the coils.

9. A rotor as in claim 1 wherein the rotor core is an iron core body.

10. A rotor as in claim 1 wherein the rotor core includes a ridge separating the coil windings.

11. A rotor as in claim 1 further comprising tension rods spanning and connected to opposite side sections of each coil, and tension rods spanning and connected to both of said coils.

12. A rotor as in claim 1 wherein the coil windings are on opposite sides of the rotor axis, and an equal distance separates the plane for each of said coil windings and the rotor axis.

13. A rotor as in claim 1 wherein the planes for each of said coil windings are parallel to each other, and the rotor axis is between said planes.

14. A rotor as in claim 1 wherein the coils are saddle coils.

15. A rotor as in claim 14 further comprising saddle coil housings that each bracket side sections of both coils.

16. A rotor for a synchronous machine comprising:
   a rotor core having a rotor axis and recessed surfaces extending longitudinally along the rotor core;

a first and second super-conducting coil windings mounted on the rotor core, each of said coil windings being in a plane that is parallel to and offset from the rotor axis;

a plurality of first tension rods spanning and connecting opposite side sections of each of said coil windings, and a plurality of second tension rods spanning between and connecting both of the coil windings.

17. A rotor as in claim 16 further comprising a plurality of channel housings each supporting a section of the side section of said coil winding and connected to an end of one of said first tension rods and one of said second tension rods.

18. A rotor as in claim 17 wherein the channel housing form a housing covering the side section entirely.

19. A rotor as in claim 17 wherein the first and second tension bars each extend through respective conduits in the rotor core.

20. A rotor as in claim 16 wherein the coils are saddle coils.

21. A rotor as in claim 20 further comprising saddle coil housings that each bracket side sections of both coils.

* * * * *